Aug. 5, 1958     G. W. BURG     2,846,233
TABLE TRUCK
Filed Jan. 17, 1955
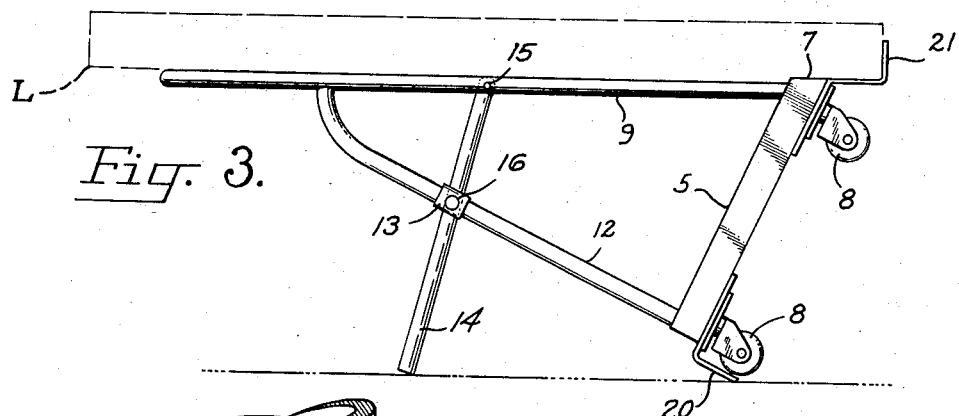
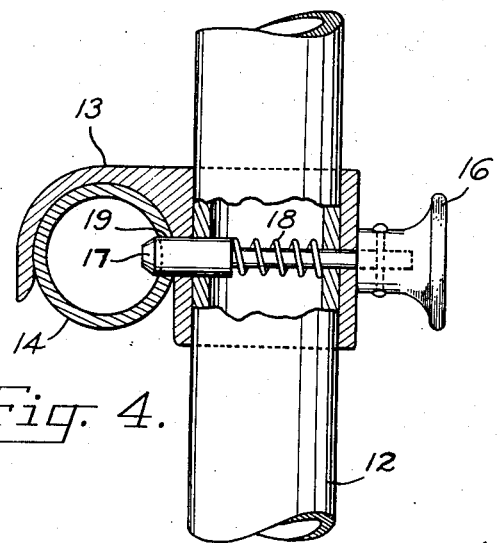
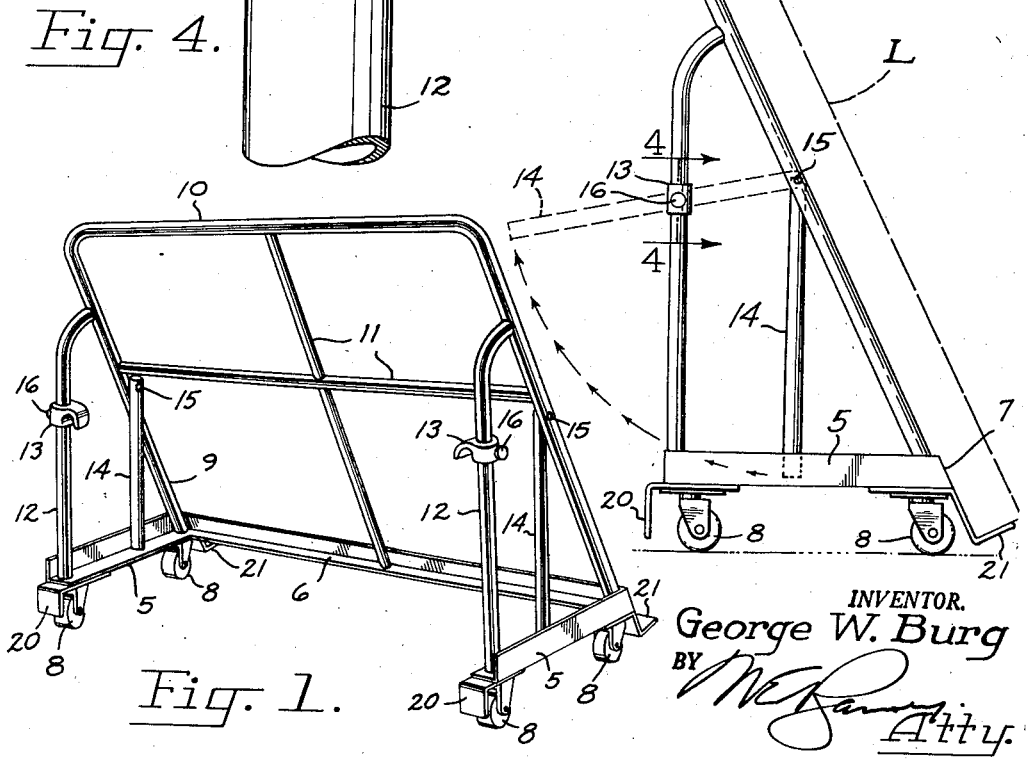
INVENTOR.
George W. Burg
BY
Atty.

United States Patent Office 2,846,233
Patented Aug. 5, 1958

2,846,233
TABLE TRUCK

George W. Burg, Portland, Oreg., assignor to Rol-Away Truck Manufacturing Company, Portland, Oreg., a corporation of Oregon Application January 17, 1955, Serial No. 482,095

3 Claims. (Cl. 280—30)

This invention relates to a materials and package handling truck particularly advantageous in the assembly, handling, and movement of long flat objects such as sheets of plywood, plate glass, sheet metal, windows, doors, and the like.

One object of my invention is to provide a truck of the above materials movement type which is capable of instantaneous conversion to a sturdy work table with a flat area for assembling, sorting, or packaging materials, such conversion being accomplished simply by tipping the truck backwards upon support props whether the truck is empty or loaded at the time of conversion.

Conversely, another inventive object is the provision of a work table upon which materials may be assembled and packaged, which work table instantly can be converted to a truck for moving the packaged materials to a shipping dock or other point of assembly.

A related inventive object is the provision of a light weight normally erect wheeled truck for the transportation of long flat materials, which truck can be tipped backwards for use as a horizontal packing or work table, the entire structure being capable of fabrication at a minimum cost in service to the mass market available thereto.

These and other advantages and objects will become apparent during a consideration of the following detailed description, taken in conjunction with the accompanying drawing, wherein:

Fig. 1 is a perspective view of the truck in an erect position;

Fig. 2 is an end view of the truck as it appears when loaded with a long flat packing case here indicated in dashed outline upon the framework, the swinging movement of the support props being indicated by direction movement arrows and dashed outline to indicate the transition to Fig. 3;

Fig. 3 is an end view with the truck tipped back for use as a horizontal packing or work table, an exemplary flat packing case or the like being shown in dashed outline in position upon the work table; and Fig. 4 is an enlarged detail, partially broken away and taken substantially on the line 4—4 of Fig. 2, showing the saddle and keeper which retain each support prop in the extended position when the truck is tipped back for use as a packing or work table.

The main structural element of my table truck consists of an elongated U-shaped base member which normally is arranged in a horizontal position with each leg thereof defining a side member 5 and with the connecting piece defining a front member 6. I prefer to form this base member from a metal angle piece which is modified across the front portion 6 to provide an oblique flat plane surface 7. This surface 7 lies at an oblique rearward slope to the vertical in the erect position of Fig. 2 and is proportioned to lie in a horizontal plane in the tipped position of the truck shown in Fig. 3. There thus is defined a reference or datum plane in which the load L is supported both for transportation and for work.

In order to define a portable structure, a pair of spaced caster wheels 8 depend from each of the side members 5. These wheels preferably have a rubber tread and are sturdy so as to support a load which may exceed one ton. In practice, I prefer to employ casters which are locked or fixed against longitudinal movement in order that the wheels will stay in place while the truck is tipped.

The second main structural element of the table truck consists of an elongated U-shaped tubular frame member having side legs 9 and a connecting top piece 10. This frame member extends upwardly in extension of the flat plane surface 7 and at an oblique angle to the vertical with each of the legs 9 supported upon the front portion of a corresponding one of the side members 5. Tubular cross pieces 11 are welded or otherwise supported upon the frame member substantially in the same plane therewith. Together, these various members define a flat load support area when the truck is erect as shown in Fig. 2 and a flat work table area when the truck is tipped back as shown in Fig. 3.

A pair of tubular brace members 12 extend downwardly and rearwardly from adjacent the top of each of the frame legs 9 and are supported upon the rear portion of a corresponding one of the side members 5. Each of these brace members 12 carries a saddle member 13 for a purpose hereinafter to be described. Thus, structural strength is combined with light weight by providing a triangular, braced construction of hollow tubular members which preferably are joined together by welding and are supported upon a strong base. The light weight factor further is enhanced if each of the structural members is formed of aluminum, magnesium or a related light metal, alloy or the like.

Comparing Figs. 2 and 3, it will be seen that I have provided a pair of free swinging tubular support props 14. Each of these is pivotally mounted adjacent the upper end thereof as indicated at 15 in order to accommodate the movement from the retracted full line position of Fig. 2 to the extended dashed line position thereof. By this pivotal mounting, each of the support props 14 is enabled to swing freely when the table truck is tipped or is lifted erect. In the erect position, the props lie within the peripheral outline of the base member and, in the tipped position, they project rearwardly without this outline.

The manner in which each of the support props 14 fits within the corresponding one of the saddle members 13 is shown in Fig. 4. In addition and in order to retain the brace in the extended position, I provide a keeper 16 having a pin 17 and a bias spring 18 for moving the pin laterally into engagement with an aperture 19. When the table truck is tilted to the position of Fig. 3, the support props 14 are moved toward the saddles 13. Each of the keepers 16 then momentarily is retracted and released allowing each of the pins 17 to fit within the corresponding aperture 19. The fit of the pins is such that the strain is taken by the saddle members when the truck is used as a work table.

To complete the structure, I provide a pair of angular brackets 20 which depend from the rear portion of each side member 5 in order to support the base of the truck in the tipped position. These brackets also serve as bumpers when the truck is moved and thus protect the rear wheels 8 from riding over or contacting obstacles. Additionally, plural loading blades 21 project downwardly in the plane of the flat front surface 7 and are provided with angular toes arranged normal to the flat surface for insertion under the load L. To effect a loading movement, the entire table truck is tilted forward until the loading blades 21 can reach under the edge of the typical load exemplified at L. The load then is in position against the frame and a righting of the truck will tip and carry the load over center to the position illustrated in Fig. 2.

In use, my table truck is of service in transporting long flat loads of considerable weight with but one workman. It also is convertible to define a sturdy table or bench with a flat surface for assembling or packaging materials. To load the package L upon the frame, the workman stands behind the truck in a position of safety and approaches a stack of materials which preferably are arranged on edge. The entire truck then is tipped forward to insert the loading blades 21 under the load L. This particular operation is aided by stacking the load of material on pallet spacers or strips one or two inches thick as is conventional in warehouse work.

Continuing with a typical loading operation, the foot of the workman is placed against the protruding rear edge of the front member 6 with the loading blades 21 under the load. The entire frame then is pulled to an erect or upright position by placing a hand on one or each of the brace members 12. After loading, of course, the material can be transported to any point of use, onto or off of a loading dock, or into or out of a railroad car, truck, elevator, or the like. In any event, it often times is time saving and prevents prehandling of materials if cased goods such as the load L can be transported, packed, opened, and then retransported to an end point of use all without being removed from the truck. This particular sequence is possible with my table truck since the entire truck can be tilted back to the position of Fig. 3 with ease and facility and with but one man where the weight of the load is within reason. As the truck is tipped back, the brackets 20 contact the floor almost immediately. At the same time, the two support props 14 swing out and into engagement with the saddle members 13. Retraction and release of the keepers 16 then locks the support props 14 against displacement or inadvertent slippage. Because of this locked position and the coaction of the angular brackets 20, the truck is supported upon four spaced surfaces where it cannot slip, move, or tip. At the same time, there is defined a sturdy work table which is flat and well-balanced by virtue of the plane surface defined by the framework, the front face 7 of the base, and the loading blades 21.

In summary, the instant invention provides a dual purpose truck which serves either for the transportation of flat loads or as a work table. In either use, the truck is of particular utility with such materials as plate glass, sheet metal, plywood, windows, doors, and other long flat materials. The truck is of particular advantage in narrow aisles, elevators, or other locations where flat bed trucks and the like cannot pass since the load is carried in a substantially erect position. Lastly, the structure itself is simple and utilitarian in order to allow a minimum fabrication cost and sale price.

I claim:

1. In a normally erect wheeled truck for the edgewise lifting and transportation of long flat materials and, when tipped backwards, for use as a horizontal packing or work table, an elongated U-shaped base member normally arranged in a horizontal position with each leg defining a side member and with the connecting piece defining a front member, an elongated U-shaped tubular frame member extending upwardly at an oblique angle to the vertical and supported upon said base member, a tubular brace member extending downwardly and rearwardly from adjacent the top of each of said frame legs and supported upon the rear portion of a corresponding one of said side members, a tubular support prop means mounted upon said frame for movement between a retracted position within the peripheral outline of said base member and an extended position projecting rearwardly without said outline to support the truck in a tipped position, said support prop means being pivotally mounted adjacent the upper end thereof freely to swing to said retracted position when said truck is erect and to said extended position when the truck is tipped backwards, said support prop means intersecting the brace member adjacent the midpoint of said support prop, and an angular bracket depending from the rear portion of each said side member to support the base portion of said truck in said tipped position.

2. A normally erect wheeled truck for the transportation of long flat materials and, when tipped backwards, for use as a horizontal packing or work table, comprising an elongated U-shaped base member normally arranged in a horizontal position with each leg defining a side member and with the connecting piece defining a front member, plural loading blades projecting downwardly from said front member, an elongated U-shaped frame member extending upwardly at an oblique angle to the vertical and supported upon said base member, a support prop means mounted upon an intermediate portion of each of said frame legs for movement between a retracted position within the peripheral outline of said base member when the truck is erect and an extended position projecting rearwardly without said outline to support the truck in said tipped position, said support prop means being pivotally mounted adjacent the upper end thereof freely to swing to said retracted position when said truck is erect and to said extended position when the truck is tipped backwards, said support prop means intersecting the brace member adjacent the midpoint of said support prop, a keeper means detachably for securing each of said props in said extended position, each said keeper means including a laterally movable spring biased pin matable with an aperture piercing the corresponding prop, and an angular bracket depending from the rear portion of each said side member to support the base portion of said truck in said tipped position.

3. In a normally erect wheeled truck for the edgewise lifting and transportation of long flat materials and, when tipped backwards, for use as a horizontal packing or work table, an elongated light weight U-shaped base member normally arranged in a horizontal position with each leg defining a side member and with the connecting piece defining a front member, said front member having a flat plane surface normally arranged at an oblique rearward slope to the vertical but positionable in a horizontal plane when the truck is tipped backwards, an elongated light weight U-shaped tubular frame member extending upwardly in extension of said flat plane surface at an oblique angle to the vertical and having one leg supported upon the front portion of each of said side members, light weight tubular cross piece means supported upon said frame member jointly therewith and with said front member to define a flat load support area when said truck is erect and a flat work table area when the truck is tipped backwards, a light weight tubular brace member extending downwardly and rearwardly from adjacent the top of each of said frame legs and supported upon the rear portion of a corresponding one of said side members, a light weight tubular support prop means mounted upon an intermediate portion of each of said frame legs for movement between a retracted position within the peripheral outline of said base member when the truck is erect and an extended position projecting rearwardly without said outline to support the truck in said tipped position, said support prop means intersecting the brace member adjacent the midpoint of said support prop, saddle means mounted upon each of said brace member legs to receive a corresponding one of said support props in the extended position thereof, keeper means detachably for securing each of said props within said saddle in said extended position, and an angular bracket depending from the rear portion of each said side member to support the base portion of said truck in said tipped position.

References Cited in the file of this patent

UNITED STATES PATENTS

| | | |
|---|---|---|
| 123,707 | Kind | Feb. 13, 1872 |
| 358,486 | Seibert | Mar. 1, 1887 |
| 1,035,471 | Rockwell | Aug. 13, 1912 |
| 1,375,593 | Kaufman | Apr. 19, 1921 |
| 1,774,520 | Lyford | Sept. 2, 1930 |
| 1,971,744 | Brykczynski et al. | Aug. 28, 1934 |
| 2,078,217 | Best | Apr. 27, 1937 |
| 2,208,891 | Bowling | July 23, 1940 |
| 2,466,149 | Burg | Apr. 5, 1949 |